United States Patent
Kamo et al.

(10) Patent No.: US 10,396,351 B2
(45) Date of Patent: Aug. 27, 2019

(54) NEGATIVE ELECTRODE MATERIAL FOR NON-AQUEOUS ELECTROLYTE SECONDARY BATTERY AND METHOD OF PRODUCING NEGATIVE ELECTRODE ACTIVE MATERIAL PARTICLES

(71) Applicant: SHIN-ETSU CHEMICAL CO., LTD., Tokyo (JP)

(72) Inventors: Hiromichi Kamo, Takasaki (JP); Takakazu Hirose, Annaka (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 259 days.

(21) Appl. No.: 15/107,022

(22) PCT Filed: Nov. 14, 2014

(86) PCT No.: PCT/JP2014/005730
§ 371 (c)(1),
(2) Date: Jun. 21, 2016

(87) PCT Pub. No.: WO2015/107581
PCT Pub. Date: Jul. 23, 2015

(65) Prior Publication Data
US 2017/0040599 A1 Feb. 9, 2017

(30) Foreign Application Priority Data

Jan. 16, 2014 (JP) .................. 2014-006201
Feb. 21, 2014 (JP) .................. 2014-031273

(51) Int. Cl.
*H01M 4/131* (2010.01)
*H01M 4/36* (2006.01)
(Continued)

(52) U.S. Cl.
CPC .......... *H01M 4/366* (2013.01); *H01M 4/364* (2013.01); *H01M 4/386* (2013.01); *H01M 4/483* (2013.01);
(Continued)

(58) Field of Classification Search
CPC ..................... H01M 4/131; H01M 4/134
See application file for complete search history.

(56) References Cited

U.S. PATENT DOCUMENTS

| 5,395,711 A | 3/1995 | Tahara et al. |
| 6,235,427 B1 | 5/2001 | Idota et al. |

(Continued)

FOREIGN PATENT DOCUMENTS

| CN | 101339985 A | 1/2009 |
| CN | 101404330 A | 4/2009 |

(Continued)

OTHER PUBLICATIONS

Mar. 21, 2017 Office Action issued in Japanese Patent Application No. 2014-031273.
(Continued)

*Primary Examiner* — Olatunji A Godo
(74) *Attorney, Agent, or Firm* — Oliff PLC (57) ABSTRACT

A negative electrode material for a non-aqueous electrolyte secondary battery contains negative electrode active material particles containing a silicon compound expressed by $SiO_x$, where $0.5 \leq x \leq 1.6$, and a coating layer composed of an organic polymer coating the silicon compound, the silicon compound containing a lithium compound on its surface or inside. As a result, a negative electrode material for a non-aqueous electrolyte secondary battery can increase the battery capacity and improve the cycle performance and battery initial efficiency

20 Claims, 3 Drawing Sheets

(51) Int. Cl.
*H01M 4/485* (2010.01)
*H01M 4/38* (2006.01)
*H01M 4/48* (2010.01)
*H01M 4/587* (2010.01)
*H01M 4/60* (2006.01)
*H01M 4/62* (2006.01)
*H01M 10/0525* (2010.01)
*H01M 4/02* (2006.01)

(52) U.S. Cl.
CPC .......... *H01M 4/485* (2013.01); *H01M 4/587* (2013.01); *H01M 4/604* (2013.01); *H01M 4/622* (2013.01); *H01M 4/624* (2013.01); *H01M 10/0525* (2013.01); *H01M 2004/027* (2013.01)

(56) References Cited

U.S. PATENT DOCUMENTS

| | | |
|---|---|---|
| 7,459,236 B2 | 12/2008 | Konishiike et al. |
| 8,377,592 B2 | 2/2013 | Jeong et al. |
| 2006/0099507 A1 | 5/2006 | Kogetsu et al. |
| 2008/0176137 A1 | 7/2008 | Endo et al. |
| 2008/0311472 A1 | 12/2008 | Yamaguchi et al. |
| 2009/0087748 A1 | 4/2009 | Choi et al. |
| 2009/0202911 A1 | 8/2009 | Fukuoka et al. |
| 2010/0285367 A1 | 11/2010 | Matsui et al. |
| 2011/0244333 A1* | 10/2011 | Kawada ............... H01M 4/131 429/231.8 |
| 2012/0258371 A1 | 10/2012 | Nakanishi et al. |
| 2012/0295155 A1* | 11/2012 | Deng .................. H01B 1/122 429/200 |
| 2014/0110639 A1 | 4/2014 | Yamamura |
| 2014/0227602 A1* | 8/2014 | Sumida ............... H01M 2/145 429/246 |
| 2015/0115206 A1 | 4/2015 | Fujii et al. |
| 2015/0221950 A1 | 8/2015 | Minami et al. |

FOREIGN PATENT DOCUMENTS

| | | |
|---|---|---|
| CN | 101800303 A | 8/2010 |
| CN | 102738440 A | 10/2012 |
| EP | 582173 A1 | 2/1994 |
| JP | H06-325765 A | 11/1994 |
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-059213 A | 3/2007 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2012-164624 A | 8/2012 |
| JP | 2013-008567 A | 1/2013 |
| JP | 2013-513206 A | 4/2013 |
| JP | 2013-191578 A | 9/2013 |
| JP | 2014-026776 A | 2/2014 |
| JP | 2014-220216 A | 11/2014 |
| WO | 2011/068767 A1 | 6/2011 |
| WO | 2013/168727 A1 | 11/2013 |
| WO | WO2013179526 | * 12/2013 |
| WO | 2014/049992 A1 | 4/2014 |

OTHER PUBLICATIONS

Jun. 20, 2017 Extended Search Report issued in European Patent Application No. 14878511.6.
Sep. 19, 2017 Decision of Refusal issued in Japanese Patent Application No. 2014-031273.
Feb. 10, 2015 Search Report issued in International Patent Application No. PCT/JP2014/005730.
Jul. 19, 2016 Preliminary Report on Patentability issued in International Patent Application No. PCT/JP2014/005730.
Feb. 23, 2018 Office Action issued in Chinese Patent Application No. 201480073366.X.
Jul. 24, 2018 Office Action issued in European Application No. 14 878 511.6.

* cited by examiner

NEGATIVE ELECTRODE MATERIAL FOR NON-AQUEOUS ELECTROLYTE SECONDARY BATTERY AND METHOD OF PRODUCING NEGATIVE ELECTRODE ACTIVE MATERIAL PARTICLES

TECHNICAL FIELD

The present invention relates to a negative electrode material for a non-aqueous electrolyte secondary battery and a method of producing negative electrode active material particles. The present invention also relates to a negative electrode for a non-aqueous electrolyte secondary battery using the negative electrode material and a non-aqueous electrolyte secondary battery using the negative electrode.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon materials ranges from a standard application type to an integrated type in which the materials are directly accumulated on a current collector.

Use of silicon as a main material of a negative electrode active material, however, expands or shrinks a negative electrode active material when charging or discharging, thereby making the negative electrode active material particle easy to break particularly near its surface layer. In addition, this active material particle produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial battery efficiency and the cycle performance.

More specifically, a vapor deposition method is used to accumulate silicon and amorphous silicon dioxide simultaneously so that better cycle performance and greater safety are achieved (See Patent Document 1, for example). Moreover, a carbon material, an electronic conduction material, is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). Moreover, a lithium-containing material is added to a negative electrode, and pre-doping that decomposes lithium and moves the lithium to a positive electrode at a higher negative-electrode potential is performed so that the first charge and discharge efficiency is improved (See Patent Document 6, for example).

Moreover, $SiO_x$ ($0.8 \leq x \leq 1.5$) having a particle size ranging from 1 μm to 50 μm and a carbon material are mixed and calcined at a high temperature so that improved cycle performance is achieved (See Patent Document 7, for example). Moreover, a mole ratio of oxygen to silicon in a negative electrode active material is adjusted in the range from 0.1 to 0.2 so as to hold a difference between the maximum and the minimum of the oxygen-to-silicon mole ratio near the interface between the active material and a current collector at 0.4 or less, so that improved cycle performance is achieved (See Patent Document 8, for example). Moreover, a metal oxide containing lithium is used to improve the battery load characteristic (See Patent Document 9, for example). Moreover, a hydrophobic layer such as a silane compound is formed in the surface layer of a silicon material so that improved cycle performance is achieved (See Patent Document 10, for example).

Moreover, a silicon oxide is used and coated with graphite to give conductivity so that improved cycle performance is achieved (See Patent Document 11, for example). Patent Document 11 describes that a shift value of the graphite coating, which is obtained from a Raman spectrum, has broad peaks at 1330 $cm^{-1}$ and 1580 $cm^{-1}$ and a ratio $I_{1330}/I_{1580}$ of its intensity shows $1.5 < I_{1330}/I_{1580} < 3$.

Moreover, a particle having an Si-microcrystal phase dispersing in a silicon dioxide is used to achieve a higher battery capacity and improved cycle performance (See Patent Document 12, for example). Finally, a silicon oxide having a silicon-to-oxygen atomicity ratio of 1:y ($0<y<2$) is used to improve overcharge and overdischarge performance (See Patent Document 13, for example).

CITATION LIST

Patent Literature

Patent Document 1: Japanese Patent Application Publication No. 2001-185127

Patent Document 2: Japanese Patent Application Publication No. 2002-042806
Patent Document 3: Japanese Patent Application Publication No. 2006-164954
Patent Document 4: Japanese Patent Application Publication No. 2006-114454
Patent Document 5: Japanese Patent Application Publication No. 2009-070825
Patent Document 6: Japanese Patent Application Publication No. 2013-513206
Patent Document 7: Japanese Patent Application Publication No. 2008-282819
Patent Document 8: Japanese Patent Application Publication No. 2008-251369
Patent Document 9: Japanese Patent Application Publication No. 2008-177346
Patent Document 10: Japanese Patent Application Publication No. 2007-234255
Patent Document 11: Japanese Patent Application Publication No. 2009-212074
Patent Document 12: Japanese Patent Application Publication No. 2009-205950
Patent Document 13: Japanese Patent No. 2997741

SUMMARY OF INVENTION

Technical Problem

As described previously, small mobile devices, represented by electronic devices, have been developed to improve their performance and increase their functions. Non-aqueous electrolyte secondary batteries, especially lithium-ion secondary batteries, which are used as main sources of the devices, have been required to increase the battery capacity. The development of non-aqueous electrolyte secondary batteries including negative electrodes mainly using silicon materials have been desired to solve this problem. The non-aqueous electrolyte secondary batteries using silicon materials need the same cycle performance as non-aqueous electrolyte secondary batteries using carbon materials.

The present invention was accomplished in view of the above problems, and an object thereof is to provide a negative electrode material for a non-aqueous electrolyte secondary battery that can increase the battery capacity and improve the cycle performance and battery initial efficiency. Another object of the present invention is to provide a negative electrode for a non-aqueous electrolyte secondary battery using the negative electrode material and a non-aqueous electrolyte secondary battery using the negative electrode. Further object of the present invention is to provide a method of producing negative electrode active material particles usable in the negative electrode material.

Solution to Problem

To achieve this object, the present invention provides a negative electrode material for a non-aqueous electrolyte secondary battery, comprising negative electrode active material particles comprising a silicon compound expressed by $SiO_x$, where $0.5 \leq x \leq 1.6$, and a coating layer composed of an organic polymer coating the silicon compound, the silicon compound containing a lithium compound on its surface or inside.

The negative electrode material having such negative electrode active material particles, in which a $SiO_2$ component part to be destabilized with insertion and extraction of lithium ion is previously modified into a lithium compound, can reduce irreversible capacity generated at charging. In addition, the coating layer composed of the organic polymer coating the silicon compound provides excellent resistance to an organic solvent and an aqueous solvent. This allows the negative electrode material to have excellent resistance to an organic solvent and an aqueous solvent as well as excellent capacity retention rate and first efficiency. Furthermore, the negative electrode material mainly composed of the silicon compound can increase battery capacity.

The organic polymer preferably contains at least one of a fluoroethylene group, a carboxyl group, a hydroxyl group, and a carbonate group within its molecule. Moreover, the organic polymer preferably comprises at least one of polyacrylic acid and an alkali metal salt thereof, carboxymethyl cellulose and an alkali metal salt thereof, polyvinyl alcohol, polycarbonate, polyvinylidene fluoride, and polyvinylidene tetrafluoride.

The coating layer using such an organic polymer can more effectively impart excellent resistance to an aqueous solvent to the negative electrode material.

A content of the organic polymer is preferably 0.01 mass % or more and less than 5 mass % with respect to the whole negative electrode active material particles.

Such a content of the organic polymer enables resistance to an aqueous solvent to be more surely provided while keeping electrical conductivity and ionic conductivity high.

At least a part of the organic polymer preferably has an island-shaped structure.

The island-shaped structure of the organic polymer can minimize the reduction of electrical conductivity and ionic conductivity of the negative electrode active material particles due to coating with the organic polymer and enables the coated particles to have resistance to an aqueous solvent.

The silicon compound preferably contains at least one lithium compound selected from $Li_2CO_3$, $Li_2O$, and $LiF$ on its surface. Moreover, the silicon compound preferably contains at least one lithium compound selected from $Li_4SiO_4$, $Li_6Si_2O_7$, and $Li_2SiO_3$ inside.

When the silicon compound contains such compounds on its surface or inside, the effect of the present invention can be more effectively exhibited.

The silicon compound is preferably at least partially coated with a carbon compound. In this case, a coverage of the carbon compound is preferably 15 mass % or less with respect to a total of the silicon compound and the carbon compound.

At least partially coating the silicon compound with a carbon compound yields an effect of improving conductivity. Moreover, the above range of coverage can ensure adequate capacity.

The silicon compound preferably satisfies $0.05 \leq A/B \leq 3.00$, more preferably $0.10 \leq A/B \leq 1.00$, when subjected to X-ray photoelectron spectroscopy (XPS) on its surface layer where A is a peak area of a peak when a C1s binding energy is about $287.5 \pm 1.0$ eV, and B is a peak area of a peak when the C1s binding energy is about $284.0 \pm 1.0$ eV.

When the above relationship exists between the peak area A for a binding energy mainly attributable to carboxyl group of about $287.5 \pm 1.0$ eV and the peak area B for a binding energy attributable to single carbon of $284.0 \pm 1.0$ eV, a carboxyl group on the surface layer of the silicon compound improves adhesion between the organic polymer and a binder in a negative electrode, resulting in improved battery performances.

The coating layer composed of the organic polymer preferably contains a particulate carbon-based material having a median size smaller than that of the silicon compound.

The coating layer containing the carbon-based material having a median size smaller than that of the silicon compound can improve electrical conductivity between particles of the silicon compound.

The silicon compound preferably exhibits a diffraction peak having a half width (2θ) of 1.2° or more, the diffraction peak being attributable to an (111) crystal face and obtained by X-ray diffraction, and a crystallite size attributable to the crystal face is preferably 7.5 nm or less.

The silicon compound which exhibits the above half width and crystallite size has low crystallinity. Use of the silicon compound having low crystallinity, which has a few Si crystal, enables improvement in the battery performances.

The silicon compound containing the lithium compound is preferably produced by a step including an electrochemical manner.

When the silicon compound containing the lithium compound is produced by the step including an electrochemical manner, a stable lithium compound can be obtained.

Furthermore, the present invention provides a negative electrode for a non-aqueous electrolyte secondary battery, comprising any one of the above negative electrode material.

The negative electrode using the inventive negative electrode material enables a non-aqueous electrolyte secondary battery using this negative electrode to have improved cycle performance and first charge and discharge efficiency.

The negative electrode for a non-aqueous electrolyte secondary battery preferably further comprises a carbon-based negative electrode material. In this case, a median size Y of the silicon compound and a median size X of the carbon-based negative electrode material preferably satisfy X/Y≥1.

When the negative electrode contains both the carbon-based negative electrode material and the negative electrode material which includes the silicon compound containing the lithium compound and the coating layer, the negative electrode can be prevented from breaking due to change of its volume. In particular, this effect is effectively exhibited when the carbon-based negative electrode material is equal to or larger than the silicon compound.

Furthermore, the present invention provides a non-aqueous electrolyte secondary battery comprising any one of the above negative electrode.

The non-aqueous electrolyte secondary battery using the inventive negative electrode can improve the cycle performance and first charge and discharge efficiency.

Furthermore, the present invention provides a method of producing negative electrode active material particles contained in a negative electrode material for a non-aqueous electrolyte secondary battery, comprising the steps of: producing a silicon compound expressed by $SiO_x$ where 0.5≤x≤1.6; inserting lithium into the silicon compound and thereby forming a lithium compound on and/or inside the silicon compound to modify the silicon compound; and coating the silicon compound with a coating layer composed of an organic polymer to produce the negative electrode active material particles.

The method of producing negative electrode active material particles including such steps allows the $SiO_2$ component part contained in the inventive negative electrode material for a non-aqueous electrolyte secondary battery to be previously modified into a lithium compound, whereby negative electrode active material particles having the coating layer composed of the organic polymer can be manufactured.

The step of modifying the silicon compound is preferably performed in an electrochemical manner.

Modifying the silicon compound in the electrochemical manner can yield a stable lithium compound.

Advantageous Effects of Invention

The inventive negative electrode material for a non-aqueous electrolyte secondary battery, in which a $SiO_2$ component part to be destabilized with insertion and extraction of lithium ion is previously modified into a lithium compound, can reduce irreversible capacity generated at charging. In addition, the coating layer composed of the organic polymer coating the silicon compound provides excellent resistance to an organic solvent and an aqueous solvent. This allows the negative electrode material to have excellent resistance to an organic solvent and an aqueous solvent as well as excellent capacity retention rate and first efficiency.

A negative electrode for a non-aqueous electrolyte secondary battery using the inventive negative electrode material and a non-aqueous electrolyte secondary battery using this negative electrode can improve cycle performance and first charge and discharge efficiency. In addition, electronic devices, machine tools, electric vehicles, and power storage systems, etc., using the inventive secondary battery also can achieve the same effect.

Furthermore, the inventive method of producing negative electrode active material particles can produce negative electrode active material particles to be contained such a negative electrode material for a non-aqueous electrolyte secondary battery.

DESCRIPTION OF EMBODIMENTS

As described previously, use of a negative electrode mainly made of a silicon material, for use in a non-aqueous electrolyte secondary battery, has been considered to increase the capacity of the non-aqueous electrolyte secondary battery.

The non-aqueous electrolyte secondary battery using a silicon material is required to have the same cycle performance as a non-aqueous electrolyte secondary battery using a carbon material; however, no one has yet proposed a negative electrode material for this type of battery having the same cycle stability as a non-aqueous electrolyte secondary battery using a carbon material.

In view of this, the inventors diligently conducted study on a negative electrode active material that allows a non-aqueous secondary battery using a negative electrode made of this material to have good cycle performance, bringing the present invention to completion.

The inventive negative electrode material for a non-aqueous electrolyte secondary battery contains negative electrode active material particles. The negative electrode active material particles contain a silicon compound expressed by $SiO_x$, where $0.5 \leq x \leq 1.6$, and the silicon compound contains a lithium compound on its surface or inside. The negative electrode active material particles further contain a coating layer composed of an organic polymer coating the silicon compound.

<Negative Electrode for Non-Aqueous Electrolyte Secondary Battery>

Figure 1:
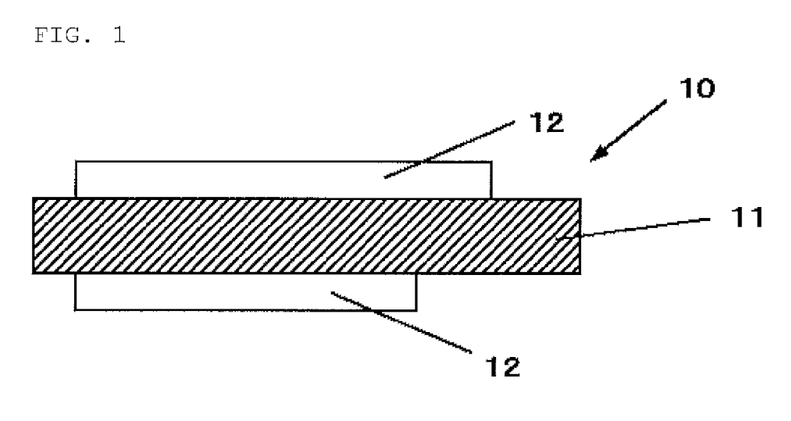
FIG. 1 is a schematic cross-sectional view of a configuration of a negative electrode for a non-aqueous electrolyte secondary battery according to an embodiment of the invention.

A negative electrode for a non-aqueous electrolyte secondary battery using the inventive negative electrode active material will be described. FIG. 1 shows a cross-sectional view of a configuration of a negative electrode for a non-aqueous electrolyte secondary battery (also simply referred to as a "negative electrode" below) according to an embodiment of the invention.

[Configuration of Negative Electrode]

As shown in FIG. 1, the negative electrode 10 has a negative electrode active material layer 12 on a negative electrode current collector 11. The negative electrode active material layer 12 may be disposed on one side or both sides of the negative electrode current collector 11. The negative electrode current collector 11 is not necessarily needed in a negative electrode using the inventive negative electrode active material.

[Negative Electrode Current Collector]

The negative electrode current collector 11 is made of a highly conductive and mechanically strong material. Examples of the conductive material used for the negative electrode current collector 11 include copper (Cu) and nickel (Ni). Such conductive materials preferably have inability to form an intermetallic compound with lithium (Li).

The negative electrode current collector 11 preferably contains carbon (C) and sulfur (S) besides the main element since these elements improve the physical strength of the current collector. In particular, when the active material layer contains a material expandable at charging, the current collector including the above elements can inhibit deformation of the electrodes and the current collector itself. Each content of the above elements is preferably, but not particularly limited to, 100 ppm or less. This content enables the deformation to be effectively inhibited.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 contains a particulate negative electrode material (hereinafter, referred to as negative electrode active material particles) that can occlude and emit lithium ions and may further contain other materials such as a negative-electrode binder and a conductive additive depending on battery design. The inventive negative electrode material for a non-aqueous electrolyte secondary battery can be used for the negative electrode active material layer 12.

The negative electrode active material particles used in the inventive negative electrode material each contain a silicon compound that can occlude and emit lithium ions and a lithium compound on the surface or in the interior of the silicon compound. The silicon compound is coated with the coating layer of the organic polymer. This structure is observed by photography of transmission electron microscope-energy dispersive X-ray spectroscopy (TEM-EDX). Occluding and emitting lithium ions may be done in at least a part of the coating layer of the organic polymer.

The negative electrode active material particles used in the inventive negative electrode material is a silicon oxide containing the silicon compound ($SiO_x$, where $0.5 \leq x \leq 1.6$); a preferable composition of the silicon compound is that x is close to 1. The reason is that this composition enables high cycle performance. The present invention does not necessarily intend a silicon material composition of 100% but permits a silicon material containing a minute amount of impurities.

Such negative electrode active material particles can be obtained by selectively modifying a part of the $SiO_2$ component formed inside the silicon compound into a lithium compound. Examples of the lithium compound inside the silicon compound include $Li_4SiO_4$, $Li_6Si_2O_7$, and $Li_2SiO_3$, which especially have good performance.

The lithium compound can be quantified by NMR (Nuclear Magnetic Resonance) and XPS (X-ray Photoelectron Spectroscopy). XPS and NMR measurements can be performed, for example, under the following conditions.

XPS
    Apparatus: an X-ray photoelectron spectroscopy apparatus
    X-ray Source: a monochromatic Al-Kα ray
    X-ray Spot Diameter: 100 μm
    Ar-ion Sputtering Gun Conditions: 0.5 kV, 2 mm×2 mm $^{29}$Si-MAS-NMR
    Apparatus: a 700-NMR spectroscope made by Broker Corp.
    Probe: a 4-mm-HR-MAS rotor, 50 μL
    Sample Rotation Speed: 10 kHz
    Temperature of Measurement Environment: 25° C.

The formation of the selective compound, i.e., the modification of the silicon compound is preferably carried out in the electrochemical manner.

Such modification (bulk modification) to produce the negative electrode active material particles can reduce or prevent the lithium compound formation in an Si region, whereby a substance stable in the air, water slurry, or solvent slurry can be obtained. Moreover, electrochemical modification can produce a more stable substance than thermal modification (thermal doping method), in which the compound is randomly modified.

$Li_4SiO_4$, $Li_6Si_2O_7$, and $Li_2SiO_3$ can improve the performance when at least one of them is formed within a bulk of the silicon compound, and the combination of two or more of them can further improve the performance.

In addition, the silicon compound preferably contains at least one lithium compound selected from $Li_2CO_3$, $Li_2O$, and LiF on its surface.

Above all, formation of a fluorine compound such as LiF on the outermost surface of the silicon compound dramatically improves the powder storage property. In particular, this compound is preferably formed with a coverage of 30% or more. The most preferable material is LiF, and the most preferable forming method is an electrochemical method, though not particularly limited thereto.

As previously described, in the inventive negative electrode material, the negative electrode active material particles contain the coating layer composed of the organic polymer coating the surface of the silicon compound. Above all, the organic polymer containing at least one of a fluoroethylene group, a carboxyl group, a hydroxyl group, and a carbonate ester group within its skeleton exhibits particularly good performance. The method of forming the coating layer may include liquid immersion and drying, mixing and melting of the organic polymer and the silicon compound, and fusing with a ball mill.

The organic polymer used for the coating layer preferably includes at least one of polyacrylic acid and an alkali metal salt thereof, carboxymethyl cellulose and an alkali metal salt thereof, polyvinyl alcohol, polycarbonate, polyvinylidene fluoride, and polyvinylidene tetrafluoride.

The particle of the silicon compound having the coating layer composed of the organic polymer can improve resistance to an organic solvent and an aqueous solvent even while containing the lithium compound obtained by modifying a part of the $SiO_2$ component.

The content of the organic polymer constituting the coating layer of the silicon compound particle (the content of the organic polymer with respect to the whole negative electrode active material particles) is preferably 0.01 mass % or more and less than 5 mass %, more preferably 0.05 mass % or more and less than 3 mass %. When the content of the organic polymer is 0.01 mass % or more, the effect of the coating layer can be more surely exhibited, resulting in improved resistance to an organic solvent and an aqueous solvent. When the content is less than 5 mass %, the surface of the negative electrode active material particles can keep good electrical conductivity and ionic conductivity, and thus battery performances can be prevented from deteriorating.

The coating amount of the coating layer can be calculated, for example, by comparing the weight of the negative electrode active material particles before and after the formation of the coating layer or by elemental analysis.

In this case, the organic polymer constituting the coating layer preferably at least partially forms an island-structure. This structure can minimize the reduction of electrical conductivity and ionic conductivity of the negative electrode active material particles due to coating with the organic polymer and enables the coated particles to have resistance to an aqueous solution.

The silicon compound is preferably at least partially coated with a carbon compound. In this case, the coverage of the carbon compound is preferably 15 mass % or less with respect to the total of the silicon compound and the carbon compound. This allows improvement of electrical conductivity. Although the carbon coating exceeding 15 mass % does not deteriorate the battery performance, it reduces battery capacity. Therefore, the coverage is preferably 15 mass % or less. The coating method with the carbon compound is preferably, but not particularly limited to, sugar carbonization or pyrolysis of hydrocarbon gas, for these methods can improve the coverage.

The silicon compound preferably satisfies 0.05≤A/B≤3.00, more preferably 0.10≤A/B≤1.00, when subjected to XPS on its surface layer where A is a peak area of a peak when a C1s orbital binding energy is about 287.5±1.0 eV, and B is a peak area of a peak when the C1s orbital binding energy is about 284.0±1.0 eV. The reason is that when the above relationship exists between the peak for a binding energy mainly attributable to carboxyl group of about 287.5±1.0 eV and the peak for a binding energy attributable to single carbon of 284.0±1.0 eV, a carboxyl group on the surface layer of the silicon compound improves adhesion between the organic polymer and a binder in a negative electrode, resulting in improved battery performances. A/B of 3.00 or less prevents a carboxyl group and the like from excessively increasing on the surface, thus prevents the carbon coating from being covered, and consequently prevents electrical and ionic conductivities from decreasing. A/B of 0.05 or more allows a carboxyl group and the like to be on the surface layer of the silicon compound in sufficient amount to exhibit the effect.

The coating layer composed of the organic polymer preferably contains a particulate carbon-based material having a median size smaller than that of the silicon compound. In other words, particles of a carbon compound having a median size smaller than that of the silicon compound are preferably around the silicon compound. This allows improvement of electrical conductivity between particles of the silicon compound. This carbon compound can be around the negative electrode active material particles by, for example, physically mixing with negative electrode active material particles.

A lower crystallinity of the silicon compound contained in the inventive negative electrode material is better. More specifically, the silicon compound preferably exhibits a diffraction peak having a half width (2θ) of 1.2° or more that is attributable to an Si(111) crystal face and obtained when X-ray diffraction is performed on the silicon compound, and a crystallite size of 7.5 nm or less that is attributable to the crystal face. Use of the silicon compound with low crystallinity, which has a few Si crystal, can improve the battery performances and allows production of a stable lithium compound.

The median size of the silicon compound preferably ranges from 0.5 μm to 20 μm, but not particularly limited thereto. This range makes it easy to occlude and emit lithium ions and inhibits the breakage of the particles at charging and discharging. A median size of 0.5 μm or more then prevents the silicon compound surface from increasing and can thus reduce the battery irreversible capacity; a median size of 20 μm or less inhibits the breakage of the particles and the creation of a new surface, so that this range is preferable.

The negative-electrode binder may be, for example, one or more of a polymer material and a synthetic rubber. Examples of the polymer material include polyvinylidene fluoride, polyimide, polyamideimide, aramid, polyacrylic acid, lithium polyacrylate, and carboxymethyl cellulose. Examples of the synthetic rubber include styrene-butadiene rubber, a fluorinated rubber, and an ethylene-propylene-diene.

Examples of the negative-electrode conductive additive include carbon materials such as carbon black, acetylene black, graphite, ketjen black, carbon nanotube, carbon nanofiber, and the combination thereof.

The negative electrode active material layer 12 of FIG. 1 may be produced with a mixture of the inventive negative electrode material including the negative electrode active material particles (silicon-based negative electrode material) and a carbon material (carbon-based negative electrode material). In this manner, the negative electrode active material layer 12 can reduce its electrical resistance and a stress due to its expansion at charging. Examples of the carbon-based negative electrode material include pyrolytic carbons, cokes, glassy carbon fiber, a fired organic polymeric compound, and carbon black.

The negative electrode active material layer 12 may be formed by, for example, an application method. The application method is to mix the negative electrode active material particles and the binders, in addition to the conductive additive and the carbon material as needed, and disperse the resultant mixture into an organic solvent or water to apply the resultant to a subject.

[Method of Producing Negative Electrode]

The method of producing the inventive negative electrode will be now described.

First, the inventive method of producing negative electrode active material particles contained in a negative electrode material for a non-aqueous electrolyte secondary battery will be described. The method begins with a production of a silicon compound expressed by $SiO_x$ where $0.5 \leq x \leq 1.6$. The silicon compound is then modified by inserting lithium into the silicon compound and thereby forming a lithium compound either or both of on the silicon compound and inside the silicon compound. The silicon compound is then coated with a coating layer composed of an organic polymer.

More specifically, the negative electrode active material particles can be produced by, for example, the following procedure.

A raw material capable of generating a silicon oxide gas is first heated under an inert gas atmosphere or a reduced pressure at a temperature ranging from 900° C. to 1600° C. to produce the silicon oxide gas. The raw material is a mixture of metallic silicon powder and silicon dioxide powder. The mole ratio of the mixture preferably satisfies the relationship of 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment after the production. The produced gas is deposited on an adsorption plate. The temperature in the reactor is decreased to 100° C. or less and then a deposit is taken out. The deposit is pulverized with a ball mill or a jet mill to form powder.

The obtained powder material may be coated with a carbon coating, but this step is not essential.

Thermal CVD is desirably used to coat the obtained powder material with the carbon layer. This thermal CVD is to fill a furnace in which the silicon oxide powder is placed with a hydrocarbon gas and heat the interior of the furnace. The pyrolysis temperature is preferably, but not particularly limited to, 1200° C. or less, more preferably 950° C. or less. This temperature range enables the inhibition of an unintended disproportionation of the active material particles. The hydrocarbon gas preferably has a composition of $C_nH_m$ where $3 \geq n$, though not particularly limited thereto, for this composition enables reduction in production cost and improvement in physical properties of a pyrolysis product.

The bulk modification is preferably performed by inserting and extracting lithium in the electrochemical manner. Although apparatus structure is not particularly limited, bulk modification can be performed with, for example, a bulk modification apparatus 20 shown in FIG. 2. The bulk modification apparatus 20 shown in FIG. 2 includes a bath 27 filled with an organic solvent 23, a positive electrode 21 (lithium source) provided within the bath 27 and connected to one terminal of a power source 26, a powder storage container 25 provided within the bath 27 and connected to the other terminal of the power source 26, and a separator 24 provided between the positive electrode 21 and the powder storage container 25. In the powder storage container 25, silicon compound powder 22 is stored.

Figure 2:
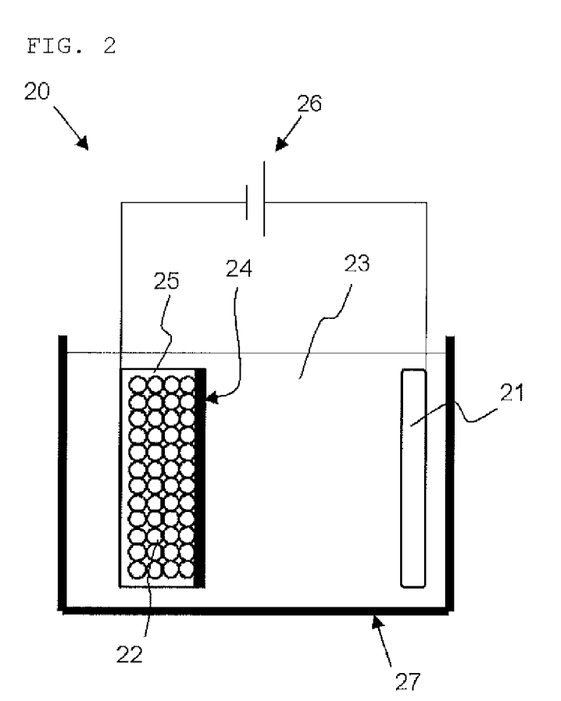
FIG. 2 is a schematic view of a bulk modification apparatus that can used in the inventive method of producing negative electrode active material particles.

The modified silicon compound powder 22 is immersed in a solution dissolving an organic polymer and then dried to form a coating layer composed of the organic polymer.

In the bulk modification treatment, when a fluorine compound is formed on the surface, the fluorine compound is preferably formed by changing voltage and temperature conditions. This yields a dense film. In particular, when fluorinated lithium is formed, it is preferable to keep the temperature 45° C. or higher during insertion and extraction of lithium.

As described previously, the modified particles thus obtained may contain no carbon layer. However, when more uniform control is required in the bulk modification treatment, voltage distribution needs to be reduced, and thus the carbon layer is desirably contained.

Examples of the organic solvent 23 in the bath 27 include ethylene carbonate, propylene carbonate, dimethyl carbonate, diethyl carbonate, ethylmethyl carbonate, fluoromethylmethyl carbonate, and difluoromethylmethyl carbonate. Examples of electrolyte salt contained in the organic solvent 23 include lithium hexafluorophosphate ($LiPF_6$) and lithium tetrafluoroborate ($LiBF_4$).

The positive electrode 21 may be a lithium foil or a Li-containing compound. Examples of the Li-containing compound include lithium carbonate and lithium oxide.

The negative electrode active material particles, the negative-electrode binder, and other materials such as conductive additives are then mixed, and the obtained negative electrode mixture is mixed with an organic solvent, water or the like to form slurry.

The mixture slurry is then applied to the surface of the negative-electrode current collector and dried to form a negative electrode active material layer 12 shown in FIG. 1. At this time, heating press may be performed, if necessary.

This negative electrode, in which the $SiO_2$ component in the bulk is modified into a stable lithium compound, can improve the battery initial efficiency and stability of the active material with cycle performance. Higher effect can be achieved by forming lithium silicate in the bulk.

In addition, the coating layer composed of the organic polymer coating the silicon compound improves resistance to an aqueous solvent.

In addition, coating the silicon compound with a carbon compound makes the compound condition in the bulk more uniform, and a fluorine compound on the surface layer improves stability of the active material, resulting in more effective negative electrode.

A negative-electrode current collector containing carbon and sulfur in an amount of 90 ppm or less is more effective.

<2. Lithium-Ion Secondary Battery>

As an embodiment of the non-aqueous electrolyte secondary battery using the above negative electrode, lithium-ion secondary battery will be now described.

[Configuration of Laminate Film Secondary Battery]

Figure 3:
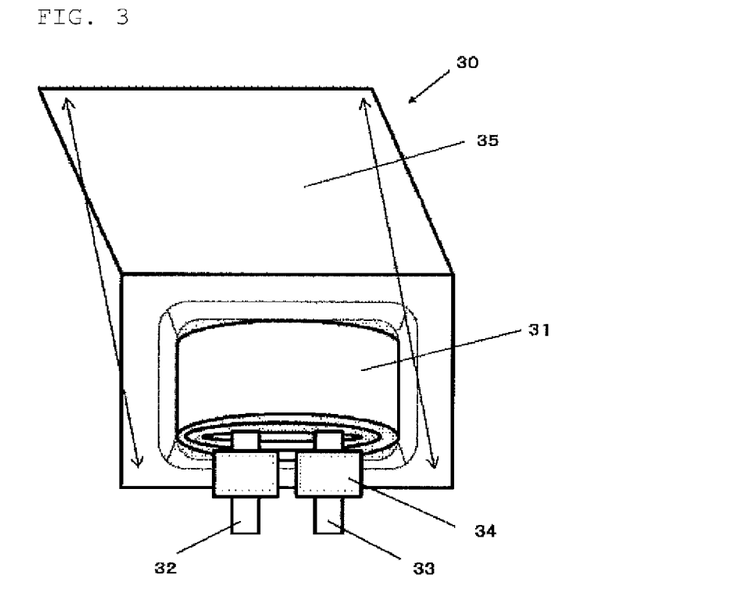
FIG. 3 is an exploded view of a laminate film type of secondary battery according to an embodiment of the invention.

The laminate film secondary battery 30 shown in FIG. 3 includes a wound electrode body 31 interposed between sheet-shaped outer parts 35. The wound electrode body are formed by winding a positive electrode, a negative electrode, and a separator disposed between these electrodes. The electrode body may also be composed of a laminated part of the positive and negative electrodes, and a separator disposed between these electrodes. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 31. The fusion-bond layer may be, for example, a film such as a polyethylene or polypropylene film; the metallic layer aluminum foil; the protecting layer nylon.

The space between the outer parts 35 and the positive and negative electrodes is filled with close adhesion films 34 to prevent air from entering therein. Exemplary materials of the close adhesion films include polyethylene, polypropylene, and polyolefin.

[Positive Electrode]

The positive electrode has a positive electrode active material layer disposed on one side or both sides of a positive-electrode current collector as in the negative electrode 10, for example, shown in FIG. 1.

The positive-electrode current collector is made of, for example, a conductive material such as aluminum.

The positive electrode active material layer contains a material that can occlude and emit lithium ions or the combination thereof, and may contain a binder, a conductive additive, a dispersing agent, or other materials according to design. The same detailed description as described for the negative-electrode binders and negative-electrode conductive additive, for example, is then given for this binder and this conductive additive.

The positive electrode material is preferably a compound containing lithium. Examples of this compound include a complex oxide composed of lithium and transition metal elements, and a phosphoric acid compound containing lithium and transition metal elements. Among them, a compound containing at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.0.5 \leq x \leq 1.10$ and $0.05 \leq y \leq 1.10$.

Examples of the complex oxide composed of lithium and transition metal elements include a lithium cobalt complex oxide ($Li_xCoO_2$), a lithium nickel complex oxide ($Li_xNiO_2$). Examples of the phosphoric acid compound containing lithium and transition metal elements include a lithium iron phosphoric acid compound ($LiFePO_4$), a lithium iron manganese phosphoric acid compound ($LiFe_{1-u}Mn_uPO_4(u<1)$). Use of these positive electrode materials enables a higher battery capacity and excellent cycle performance.

[Negative Electrode]

The negative electrode is configured as in the above negative electrode 10 for a lithium-ion secondary battery shown in FIG. 1, and has the negative electrode active material layer 12, for example, on both faces of the current collector 11. The negative electrode preferably has a negative-electrode charge capacity larger than a battery charge capacity (electrical capacitance) provided by the positive electrode active material, for this negative electrode itself can inhibit the precipitation of lithium metal.

The positive electrode active material layer is formed partially on both faces of the positive-electrode current collector. The same is true of the negative electrode active material layer. Such a negative electrode may have, for example, an area at which the positive electrode active material layer is not present on the surface of the positive-electrode current collector that the negative electrode active material layer faces. This area permits stable battery design.

The above area at which the positive and negative electrode active material layers do not face one another, a non-facing area, is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-dimethoxyethane, and tetrahydrofuran. Among these, ethylene carbonate, propylene carbonate, dimethyl carbonate, diethyl carbonate, or ethylmethyl carbonate, or the combination thereof is preferable. Such solvent enables better performances. The combination of a viscous solvent, such as ethylene carbonate or propylene carbonate, and a non-viscous solvent, such as dimethyl carbonate, diethyl carbonate or ethylmethyl carbonate allows much better performances, for such a solvent improves the dissociation of electrolyte salt and ionic mobility.

For an alloyed electrode, the solvent preferably contains a halogenated chain carbonic acid ester, or a halogenated cyclic carbonic acid ester. Such a solvent enables the negative electrode active material to be coated with a stable coating at discharging and particularly charging. The halogenated chain carbonic acid ester is a chain carbonic acid ester including halogen, in which at least one hydrogen atom is replaced by a halogen atom. The halogenated cyclic carbonic acid ester is a cyclic carbonic acid ester including halogen, in which at least one hydrogen atom is replaced by a halogen atom.

The halogen is preferably, but not limited to, fluorine, for fluorine enables the formation of better coating than other halogens do. A larger number of halogens is better, for a more stable coating can be obtained which reduces a decomposition reaction of an electrolyte.

Examples of the halogenated chain carbonic acid ester include carbonic acid fluoromethylmethyl ester, and carbonic acid methyl(difluoromethyl) ester. Examples of the halogenated cyclic carbonic acid ester include 4-fluoro-1,3-dioxolan-2-one or 4,5-difluoro-1,3-dioxolane-2-one.

The solvent preferably contains an unsaturated carbon bond cyclic carbonate as an additive, for this enables the formation of a stable coating on an electrode at charging and discharging and the inhibition of a decomposition reaction of an electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of a battery. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent is preferably in the range from 0.5 mol/kg to 2.5 mol/kg. This content enables high ionic conductivity.

[Manufacture of Laminate Film Secondary Battery]

Firstly, a positive electrode is produced with the above positive-electrode material as follows. A positive-electrode mixture is created by mixing the positive-electrode material with as necessary the binder, the conductive additive, and other materials, and dispersed in an organic solvent to form slurry of the positive-electrode mixture. This slurry is then applied to a positive-electrode current collector with a coating apparatus such as a die coater having a knife roll or a die head, and dried by hot air to obtain a positive electrode active material layer. The positive electrode active material layer is finally compressed with, for example, a roll press. The compression may be performed under heating. The heating may be repeated multiple times.

Secondly, a negative electrode active material layer is formed on a negative-electrode current collector to produce a negative electrode through the same procedure as in the above production of the negative electrode 10 for a lithium-ion secondary battery.

When the positive electrode and the negative electrode are produced, the active material layers are formed on both faces of the positive- and negative-electrode current collector. In both the electrodes, the length of these active material layers formed on the faces may differ from one another (See FIG. 1).

Finally, the following steps are carried out in the order described. An electrolyte is prepared. With ultrasonic welding, the positive-electrode lead 32 is attached to the positive-electrode current collector and the negative-electrode lead 33 is attached to the negative-electrode current collector. The positive and negative electrodes and the separator interposed therebetween are stacked or wound to produce the electrode body 31 and a protecting tape is stuck to the outermost circumference of the body. The electrode body is flattened. The film-shaped outer part 35 is folded in half to interpose the electrode body therebetween. The outer edge of the half parts is stuck to one another by heat sealing such that one of the four sides is opened to house the electrode body. The close adhesion films are inserted between the outer part and the positive- and negative-electrode leads. The prepared electrolyte is introduced from the open side in a prescribed amount to perform the impregnation of the electrolyte under a vacuum. The open side is stuck by vacuum heat sealing.

In this manner, the laminate film secondary battery 30 can be produced.

EXAMPLE

Hereinafter, the present invention will be more specifically described with reference to examples and comparative examples, but the present invention is not limited to these examples.

Example 1-1

The laminate film secondary battery 30 shown in FIG. 3 was produced by the following procedure.

The procedure began with the production of a positive electrode. Positive electrode active materials of 95 mass parts of $LiCoO_2$ (lithium cobalt complex oxide), 2.5 mass parts of positive-electrode conductive additive, and 2.5 mass parts of positive-electrode binders (polyvinylidene fluoride, PVDF) were mixed to produce a positive-electrode mixture. The positive-electrode mixture was dispersed in an organic solvent (N-methyl-2-pyrrolidone, NMP) to form paste slurry. The slurry was applied to both surfaces of a positive-electrode current collector with a coating apparatus having a die head and dried with a drying apparatus of hot-air type. The positive-electrode current collector had a thickness of 15 μm. The resultant was finally compressed with a roll press.

Next, a negative electrode was produced. For the production of a negative electrode active material, a mixed raw material of metallic silicon and silicon dioxide was placed in a reactor and evaporated under a vacuum of 10 Pa to deposit the evaporated material on an adsorption plate. The deposit was sufficiently cooled and then taken out to pulverize the deposit with a ball mill. After adjusting the particle size of the obtained powder, the powder was coated with a carbon layer by thermal CVD, as needed. The produced powder was bulk-modified by the electrochemical method in a mixed solvent having a propylene-carbonate-to-ethylene-carbonate volume ratio of 1:1, including 1.3 mol/kg of electrolyte salt. The obtained material was immersed in a NMP solution containing polyvinylidene fluoride and then dried. The powder was thereby coated with a coating layer composed of the organic polymer of polyvinylidene fluoride. The negative electrode active material particles thus obtained, a negative-electrode binder, a first conductive additive, and a second conductive additive were mixed at a dry-weight ratio of 80:8:10:2. The mixture was diluted with water to form paste slurry of a negative-electrode mixture. The water was used as a solvent for the negative-electrode binder of polyacrylic acid. The negative-electrode mixture slurry was then applied to both surfaces of a negative-electrode current collector with a coating apparatus and dried. The negative-electrode current collector used was an electrolytic copper foil, having a thickness of 15 μm. The resultant negative-electrode current collector was fired under a vacuum at 70° C. for 5 hour.

A solvent was produced by mixing 4-fluoro-1,3-dioxolan-2-one (FEC), ethylene carbonate (EC), and dimethyl carbonate (DMC) and an electrolyte salt (lithium hexafluorophosphate, $LiPF_6$) was dissolved therein to produce an electrolyte. The composite of the solvent was FEC:EC:DMC=10:20:70 in term of the accumulation amount. The content of the electrolyte salt in the solvent was 1.2 mol/kg.

The secondary battery was assembled by the following procedure. An aluminum lead was first ultrasonic-welded to one end of the positive-electrode current collector. A nickel lead was welded to one end of the negative-electrode current collector. The positive electrode, a separator, the negative electrode, a separator were then stacked in this order and wound in a longitudinal direction to obtain a wound electrode body. The end of the wounded part was fixed by a PET protecting tape. The separators were a 12-μm laminate film composed of a porous polyethylene film interposed between porous polypropylene films. The electrode body was interposed between outer parts and the outer circumferences except one side were heat-sealed to house the electrode body therein. The outer parts were an aluminum laminate film composed of a nylon film, aluminum foil, and a polypropylene film stacked. The prepared electrolyte was poured from an open side to perform the impregnation of the electrolyte under a vacuum. The open side was stuck by heat sealing.

Examples 1-2 to 1-7

A secondary battery was produced as in example 1-1 except for changing the type of the organic polymer constituting the coating layer coating the powder surface of the silicon compound in the negative electrode material. As the organic polymer for the coating layer, polyacrylic acid, sodium polyacrylate, polypropylene carbonate, sodium carboxymethyl cellulose, polypropylene carbonate, and polyethylene were used in examples 1-2 to 1-7, respectively.

Comparative Example 1-1

A secondary battery was produced as in example 1-1 except that the coating layer coating the powder surface of the silicon compound in the negative electrode material was not formed.

The silicon compounds in examples 1-1 to 1-7 and comparative example 1-1 had the following physical properties: the silicon compounds had a median size $D_{50}$ of 5 μm; the half width (2θ) of the diffraction peak attributable to an Si(111) crystal face and obtainable by X-ray diffraction was 1.22°; the crystallite size attributable to the (111) crystal face was 7.21 nm; the silicon compounds were $SiO_x$ where x=0.9; the silicon compound contained LiF, $Li_2CO_3$, and $Li_2O$ on its surface; the active material contained $Li_4SiO_4$, $Li_6Si_2O_7$, and $Li_2SiO_3$ inside.

In examples 1-1 to 1-7 and comparative example 1-1, the carbon coverage was 5.0 mass %. In examples 1-1 to 1-7 and comparative example 1-1, the organic polymer content was 1% with respect to the whole negative electrode material particles.

The cycle performance and the first charge and discharge efficiency of the secondary batteries in examples 1-1 to 1-7 and comparative example 1-1 were investigated. The result is given in Table 1.

The cycle performance was investigated in the following manner: First, two cycles of charging and discharging were performed at 25° C. to stabilize the battery and the discharge capacity in the second cycle was measured. Next, the cycle of charging and discharging was repeated until the total number of cycles reached 100 cycles and the discharge capacity was measured every cycle. Finally, a capacity retention rate % was calculated by dividing the discharge capacity in the 100-th cycle by the discharge capacity in the second cycle and multiply the resultant by 100 to express as a percent. The cycle conditions were as follows: The secondary batteries were charged with a constant current of 2.5 mA/cm² until the voltage reached 4.2V. After this voltage reached 4.2V, the charging was continued while the current density became 0.25 mA/cm² at 4.2V. The batteries were then discharged with a constant current density of 2.5 mA/cm² until the voltage reached 2.5V.

The first charge and discharge efficiency was calculated by the following expression:

Initial Efficiency (%)=(First Discharge Capacity/First Charge Capacity)×100

The atmosphere temperate was the same as the cycle performance was investigated. The charging and discharging conditions were 0.2 times the conditions of the investigation of the cycle performance.

TABLE 1

| | Organic polymer | Capacity retention rate (%) | Initial efficiency (%) |
|---|---|---|---|
| Comparative example 1-1 | — | 64.3 | 70.1 |
| Example 1-1 | polyvinylidene fluoride | 84.2 | 75.0 |
| Example 1-2 | polyacrylic acid | 84.4 | 74.3 |
| Example 1-3 | sodium polyacrylate | 84.0 | 76.0 |
| Example 1-4 | polypropylene carbonate | 83.7 | 75.0 |
| Example 1-5 | sodium carboxymethyl cellulose | 83.6 | 75.0 |
| Example 1-6 | polypropylene carbonate | 70.2 | 73.0 |
| Example 1-7 | polyethylene | 67.9 | 69.0 |

As shown in Table 1, when the type of the organic polymer coating the silicon compound particle was changed, the battery performances were changed depending on the polymer skeleton. The polymer containing at least one of a fluoroethylene group, a carboxyl group, a hydroxyl group, and a carbonate group within its skeleton particularly improved the capacity retention rate and the first efficiency.

In the following examples, polyvinylidene fluoride was used as the organic polymer.

Examples 2-1 to 2-5 and Comparative Examples 2-1 and 2-2

A secondary battery was produced as in example 1-1 except that oxygen amount in a bulk of the silicon compound was adjusted when the negative electrode material was produced. The amount of accumulated oxygen was adjusted by changing the temperature and the ratio of raw materials to be vaporized. Table 2 shows the x-value of the silicon compound expressed by $SiO_x$ in examples 2-1 to 2-5 and comparative examples 2-1 and 2-2.

The silicon compounds in examples 2-1 to 2-5 and comparative examples 2-1 and 2-2 had the following physical properties: the silicon compounds had a median size $D_{50}$ of 5 μm; the half width (2θ) of the diffraction peak attributable to an Si(111) crystal face and obtainable by X-ray diffraction was 1.22°; the crystallite size attributable to the (ill) crystal face was 7.21 nm; the silicon compound contained LiF, $Li_2CO_3$, and $Li_2O$ on its surface; the active material contained $Li_4SiO_4$, $Li_6Si_2O_7$, and $Li_2SiO_3$ inside.

In examples 2-1 to 2-5 and comparative examples 2-1 and 2-2, the carbon coverage was 5.0 mass %, and the organic polymer (polyvinylidene fluoride) content was 1% with respect to the whole negative electrode material particles.

The cycle performance and the first charge and discharge efficiency of the secondary batteries in examples 2-1 to 2-5 and comparative examples 2-1 and 2-2 were investigated. The result is given in Table 2.

TABLE 2

| | X value of SiOx | Capacity retention rate (%) | Initial efficiency (%) |
|---|---|---|---|
| Comparative example 2-1 | 0.3 | 65.3 | 81.0 |
| Example 2-1 | 0.5 | 80.2 | 77.1 |
| Example 2-2 | 0.7 | 80.8 | 75.9 |
| Example 2-3 | 0.9 | 84.1 | 75.6 |
| Example 2-4 | 1.2 | 81.0 | 75.2 |
| Example 2-5 | 1.6 | 81.1 | 74.3 |
| Comparative example 2-2 | 1.8 | 75.3 | 72.1 |

As shown in Table 2, when the oxygen amount was lack (comparative example 2-1, x=0.3), the capacity retention rate significantly degraded although the initial efficiency was improved. When the oxygen amount was excess (comparative example 2-2, x=1.8), both the capacity retention rate and the initial efficiency degraded due to reduction in conductivity. In the following examples, $SiO_x$ with an x-value of 0.9 was used.

Examples 3-1 and 3-2

A secondary battery was produced as in example 1-1 except that, when the silicon compound was bulk-modified to produce a lithium compound, voltage, current, and the method for inserting and extracting lithium were changed to adjust the condition of the compound produced in the silicon compound. The electrochemical modification produces LiF, $Li_2CO_3$, and $Li_2O$ on the surface, and $Li_2SiO_3$, $Li_6Si_2O_7$, and $Li_4SiO_4$ inside. Moreover, the lithium compound on the surface can be removed by cleaning with water. In this way, in example 3-1, LiF, $Li_2CO_3$, and $Li_2O$ were produced on the surface and $Li_2SiO_3$, $Li_6Si_2O_7$, and $Li_4SiO_4$ were produced inside the silicon compound. In example 3-2, the lithium compounds on the surface of the silicon compound were removed while $Li_2SiO_3$, $Li_6Si_2O_7$, and $Li_4SiO_4$ remained inside.

The obtained lithium compounds could be observed by XPS. For example, $Li_4SiO_4$ was detected by a binding energy of about 532 eV and $Li_2SiO_3$ was detected by a binding energy of about 530 eV. The obtained lithium compounds could also be observed by $^{29}$Si-MAS-NMR spectrum.

Comparative Example 3-1

A secondary battery was produced as in example 1-1 except that the silicon compound was not bulk-modified.

The silicon compounds in examples 3-1 and 3-2 and comparative example 3-1 had the following physical properties: the silicon compounds had a median size $D_{50}$ of 5 μm; the half width (2θ) of the diffraction peak attributable to an Si(111) crystal face and obtainable by X-ray diffraction was 1.22°; the crystallite size attributable to the (111) crystal face was 7.21 nm.

In examples 3-1 and 3-2 and comparative example 3-1, the carbon coverage was 5.0 mass %, and the organic polymer (polyvinylidene fluoride) content was 1% with respect to the whole negative electrode material particles.

The cycle performance and the first charge and discharge efficiency of the secondary batteries in examples 3-1 and 3-2 and comparative example 3-1 were investigated. The result is given in Table 3.

TABLE 3

| | Compound contained on surface layer | Compound contained inside active material | Capacity retention rate (%) | Initial efficiency (%) |
|---|---|---|---|---|
| Comparative example 3-1 | — | — | 68.1 | 67.1 |
| Example 3-1 | LiF, $Li_2CO_3$, $Li_2O$ | $Li_2SiO_3$, $Li_6Si_2O_7$, $Li_4SiO_4$ | 83.1 | 75.3 |
| Example 3-2 | — | $Li_2SiO_3$, $Li_6Si_2O_7$, $Li_4SiO_4$ | 84.2 | 68.3 |

As mentioned above, when the silicon compound is modified in the electrochemical manner, LiF, $Li_2CO_3$, and $Li_2O$ are produced on the surface, and $Li_2SiO_3$, $Li_6Si_2O_7$, and $Li_4SiO_4$ are produced inside. Moreover, the lithium compound on the surface can be removed by cleaning with water. Example 3-1, in which the best bulk condition was achieved by these reaction, particularly improved the capacity retention rate and the initial efficiency. In other words, the silicon compound preferably contains $Li_2CO_3$, $Li_2O$, and LiF on its surface, and the active material preferably contains $Li_4SiO_4$, $Li_6Si_2O_7$, and $Li_2SiO_3$ inside.

Examples 4-1 to 4-3

A secondary battery was produced as in example 1-1 except that, when the silicon compound particles were coated with the coating layer of the organic polymer (polyvinylidene fluoride), the amount of the organic polymer was adjusted. More specifically, the negative electrode active material particles were immersed in a polyvinylidene fluoride NMP solution and dried repeatedly until a desired content was achieved. Table 4 shows specific content of polyvinylidene fluoride.

Comparative Example 4-1

A secondary battery was produced as in example 1-1 except that the silicon compound particles were not coated with the coating layer of the organic polymer (polyvinylidene fluoride).

The silicon compounds in examples 4-1 to 4-3 and comparative example 4-1 had the following physical properties: the silicon compounds had a median size $D_{50}$ of 5 μm; the half width (2θ) of the diffraction peak attributable to an Si(111) crystal face and obtainable by X-ray diffraction was 1.22°; the crystallite size attributable to the (111) crystal face was 7.21 nm.

In examples 4-1 to 4-3 and comparative example 4-1, the carbon coverage was 5.0 mass %.

The cycle performance and the first charge and discharge efficiency of the secondary batteries in examples 4-1 to 4-3 and comparative example 4-1 were investigated. The result is given in Table 4.

TABLE 4

| | Content of polyvinylidene fluoride contained in negative electrode active material particles (mass %) | Capacity retention rate (%) | Initial efficiency (%) |
|---|---|---|---|
| Comparative example 4-1 | — | 64.3 | 70.1 |
| Example 4-1 | 0.1 | 84.1 | 75.3 |
| Example 4-2 | 3 | 80.5 | 74.4 |
| Example 4-3 | 5 | 78.8 | 73.9 |

As shown in Table 4, the content of the organic polymer is preferably 0.01 mass % or more and less than 5 mass %. When the organic polymer was not contained (comparative example 4-1), the battery performances degraded due to reduction in resistance to an aqueous solvent. When the content of the organic polymer was less than 5%, the negative electrode active material particles was not decreased in electrical conductivity and ionic conductivity, and thus the battery performances could be prevented from deteriorating.

In the following examples, the content of the organic polymer (polyvinylidene fluoride) was 1 mass %.

Examples 5-1 to 5-4

In examples 5-1 to 5-3, a secondary battery was produced as in example 1-1 except for adjusting the carbon amount of the coating layer coating the silicon compound (the particle of the silicon oxide material) by the thermal CVD method. In example 5-4, a secondary battery was produced as in example 1-1 except that the carbon layer was not formed on the surface of the silicon compound.

The silicon compounds in examples 5-1 to 5-4 had the following physical properties: the silicon compounds had a median size $D_{50}$ of 5 μm; the half width (2θ) of the diffraction peak attributable to an Si(111) crystal face and obtainable by X-ray diffraction was 1.22°; the crystallite size attributable to the (111) crystal face was 7.21 nm.

The cycle performance and the first charge and discharge efficiency of the secondary batteries in examples 5-1 to 5-4 were investigated. The result is given in Table 5.

TABLE 5

| | Content of carbon contained in negative electrode active material particles (mass %) | Capacity retention rate (%) | Initial efficiency (%) |
|---|---|---|---|
| Example 5-1 | 5.2 | 84.1 | 75.1 |
| Example 5-2 | 10.1 | 83.8 | 75.0 |
| Example 5-3 | 15.2 | 83.2 | 74.8 |
| Example 5-4 | 0 | 76.2 | 71.3 |

As shown in Table 5, formation of the carbon layer yielded an effect of improving conductivity and thus improved the battery performances. However, increasing the carbon content can reduce the capacity, depending on battery design. Accordingly, the content is preferably 15 mass % or less in view of the battery capacity and performances.

Examples 6-1 to 6-4

In examples 6-1 to 6-4, a secondary battery was produced as in example 1-1 except for adjusting the relationship A/B between the peak area A for a C1s binding energy of about 287.5±1.0 eV and the peak area B for a C1s binding energy of about 284.0±1.0 eV when the silicon compound was subjected to XPS on its surface layer. The adjustment was performed by changing the treatment temperature in the electrochemical modification method.

The silicon compounds in examples 6-1 to 6-4 had the following physical properties: the silicon compounds had a median size $D_{50}$ of 5 μm; the half width (2θ) of the diffraction peak attributable to an Si(111) crystal face and obtainable by X-ray diffraction was 1.22°; the crystallite size attributable to the (111) crystal face was 7.21 nm.

The cycle performance and the first charge and discharge efficiency of the secondary batteries in examples 6-1 to 6-4 were investigated. The result is given in Table 6.

TABLE 6

| | A/B | Capacity retention rate (%) | Initial efficiency (%) |
|---|---|---|---|
| Example 6-1 | 4.20 | 82.1 | 74.8 |
| Example 6-2 | 1.62 | 83.8 | 75.0 |
| Example 6-3 | 0.33 | 84.1 | 75.1 |
| Example 6-4 | 0.02 | 81.8 | 74.3 |

As shown in Table 6, when A/B satisfied 0.05≤A/B≤3.00 (examples 6-2 and 6-3), the battery performances were improved. Thus, A/B is preferably 0.05≤A/B≤3.00. A/B of 3.00 or less prevented a carboxyl group and the like from excessively increasing on the surface, thus prevented the carbon coating from being covered, and consequently prevented electrical and ionic conductivities from decreasing. A/B of 0.05 or more allowed a carboxyl group and the like to be on the surface layer of the silicon compound in sufficient amount to exhibit the effect.

Examples 7-1 to 7-5

A secondary battery was produced as in example 1-1 except that a negative electrode containing a carbon-based material was produced as follows. A silicon compound and a carbon-based material whose median sizes have been adjusted were mixed with a shaker to form an electrode. The negative electrode thus produced had a structure in which the carbon-based material was around the silicon compound. The median size of the silicon compound and the median size and the content of the carbon-based material in examples 7-1 to 7-5 are as shown in Table 7.

The silicon compounds in examples 7-1 to 7-5 had the following physical properties: the half width (2θ) of the diffraction peak attributable to an Si(111) crystal face and obtainable by X-ray diffraction was 1.22°; the crystallite size attributable to the (111) crystal face was 7.21 nm.

The cycle performance and the first charge and discharge efficiency of the secondary batteries in examples 7-1 and 7-5 were investigated. The result is given in Table 7.

TABLE 7

| | Median size of silicon compound (μm) | Median size of carbon-based material (μm) | Content of carbon-based material (mass %) | Capacity retention rate (%) | Initial efficiency (%) |
|---|---|---|---|---|---|
| Example 7-1 | 8 | 6 | 2 | 82.1 | 70.3 |
| Example 7-2 | 4 | 6 | 2 | 82.4 | 71.8 |
| Example 7-3 | 4 | 0.2 | 2 | 84.1 | 75.3 |
| Example 7-4 | 4 | 0.2 | 5 | 83.9 | 73.5 |
| Example 7-5 | 4 | 0.2 | 10 | 83.5 | 71.2 |

As shown in Table 7, when the carbon-based material whose median size was smaller than that of the silicon compound was mixed (examples 7-3 to 7-5), the battery performances were improved. However, since the carbon-based material has irreversible capacity, the content thereof is preferably 5 mass % or less in view of the battery capacity and performances.

Examples 8-1 to 8-8

A secondary battery was produced as in example 1-1 except that the crystallinity of the silicon compound was changed. The crystallinity can be changed by a heat treatment under a non-atmospheric condition after insertion and extraction of lithium. Table 8 shows the half width of the silicon compound in examples 8-1 to 8-8. Although example 8-1 exhibited a crystallite size of 1.542, this value was obtained by fitting with analysis software because the peak value was not obtained. The silicon compound in example 8-1 was substantially amorphous.

The silicon compounds in examples 8-1 to 8-8 had a median size $D_{50}$ of 5 μm.

The cycle performance and the first charge and discharge efficiency of the secondary batteries in examples 8-1 to 8-8 were investigated. The result is given in Table 8.

TABLE 8

|  | Half width 2θ(°) | crystallite size (nm) | Capacity retention rate (%) | Initial efficiency (%) |
| --- | --- | --- | --- | --- |
| Example 8-1 | 10.123 | 1.542 | 84.4 | 74.5 |
| Example 8-2 | 5.01 | 3.29 | 84.3 | 74.6 |
| Example 8-3 | 2.257 | 3.77 | 84.1 | 74.9 |
| Example 8-4 | 1.845 | 4.62 | 83.6 | 75.2 |
| Example 8-5 | 1.271 | 6.63 | 83.1 | 75.3 |
| Example 8-6 | 1.025 | 8.55 | 82.0 | 75.3 |
| Example 8-7 | 0.796 | 10.84 | 79.8 | 75.5 |
| Example 8-8 | 0.756 | 11.42 | 76.5 | 75.7 |

As shown in Table 8, the capacity retention rate and the initial efficiency changed in response to the variation in the crystallinity of the silicon compound. In particular, a high capacity retention rate and a high initial efficiency were obtained by low crystallinity materials with a half width of 1.2° or more and a crystallite size of 7.5 nm or less, which is attributable to an Si(111) crystal face. The best battery performances were obtained when the silicon compound was amorphous.

Examples 9-1 to 9-4

A secondary battery was produced as in example 1-1 except that the median size of the silicon compound was adjusted. Table 9 shows the median size of the silicon compound in examples 9-1 to 9-4.

The silicon compounds in examples 9-1 to 9-4 exhibited a half width (2θ) of the diffraction peak attributable to a (111) crystal face and obtainable by X-ray diffraction of 1.22° and a crystallite size attributable to the (111) crystal face of 7.21 nm.

The cycle performance and the first charge and discharge efficiency of the secondary batteries in examples 9-1 to 9-4 were investigated. The result is given in Table 9.

TABLE 9

|  | Median size (μm) | Capacity retention rate (%) | Initial efficiency (%) |
| --- | --- | --- | --- |
| Example 9-1 | 5.1 | 84.2 | 75.3 |
| Example 9-2 | 1.3 | 82.3 | 74.8 |
| Example 9-3 | 8.1 | 84.1 | 75.2 |
| Example 9-4 | 12.3 | 83.5 | 75.3 |

As shown in Table 9, when the median size of the silicon compound particle ranged from 0.5 μm to 20 μm, the capacity retention rate and the initial efficiency were kept high.

Example 10-1

A secondary battery was produced by modifying the silicon compound in the electrochemical manner as in example 1-1.

Example 10-2

A secondary battery was produced as in example 1-1 except that the silicon compound was modified by the thermal doping method with lithium.

Comparative Example 10-1

A secondary battery was produced as in example 1-1 except that the silicon compound was not modified by introducing lithium.

The silicon compounds in examples 10-1 and 10-2 and comparative example 10-1 had the following physical properties: the silicon compounds had a median size $D_{50}$ of 5 μm; the half width (2θ) of the diffraction peak attributable to an Si(111) crystal face and obtainable by X-ray diffraction was 1.22°; the crystallite size attributable to the (111) crystal face was 7.21 nm.

The cycle performance and the first charge and discharge efficiency of the secondary batteries in examples 10-1 and 10-2 and comparative example 10-1 were investigated. The result is given in Table 10.

TABLE 10

|  | Modification method | Capacity retention rate (%) | Initial efficiency (%) |
| --- | --- | --- | --- |
| Comparative example 10-1 | — | 64.3 | 70.1 |
| Example 10-1 | Electrochemical method | 86.5 | 77.6 |
| Example 10-2 | Thermal doping method | 75 | 74 |

As shown in Table 10, the electrochemical method was preferred as the modification method of the silicon compound. The thermal doping method, in which a silicon material mixed with lithium metal or a lithium compound was subjected to heat treatment, could not modify the active material well.

Examples 11-1 to 11-8

A secondary battery was produced as in example 1-1 except that a carbon-based negative electrode material was added to the negative electrode, in addition to the negative electrode material particles containing the silicon compound. Table 11 shows the median size $D_{50}$ (Y) of the silicon compound, the median size $D_{50}$ (X) of the carbon-based negative electrode material, and the value of X/Y.

The silicon compounds in examples 11-1 to 11-8 had the following physical properties: the half width (2θ) of the diffraction peak attributable to an Si(111) crystal face and obtainable by X-ray diffraction was 1.22°; the crystallite size attributable to the (111) crystal face was 7.21 nm.

The cycle performance and the first charge and discharge efficiency of the secondary batteries in examples 11-1 to 11-8 were investigated. The result is given in Table 11.

TABLE 11

|  | $D_{50}$ of silicon compound (μm) | $D_{50}$ of carbon-based negative electrode material (μm) | X/Y | Capacity retention rate (%) | Initial efficiency (%) |
|---|---|---|---|---|---|
| Example 11-1 | 4 | 20 | 5 | 88 | 86.3 |
| Example 11-2 | 4 | 16 | 4 | 88.1 | 86.1 |
| Example 11-3 | 4 | 12 | 3 | 88 | 85.8 |
| Example 11-4 | 4 | 8 | 2 | 87.6 | 84.2 |
| Example 11-5 | 4 | 4 | 1 | 87 | 83.6 |
| Example 11-6 | 4 | 2 | 0.5 | 83.2 | 82.9 |
| Example 11-7 | 8 | 4 | 0.5 | 81.5 | 85.3 |
| Example 11-8 | 8 | 16 | 2 | 85.6 | 86.5 |

As shown in Table 11, the carbon material in the negative electrode active material layer is preferably equal to or larger than the silicon compound. When the silicon compound, which was expandable and contractible, was equal to or smaller than the carbon-based negative electrode material, breakage of the mixture layer could be prevented. When the carbon-based negative electrode material was larger than the silicon compound, the volume density of the negative electrode at charging, the initial efficiency, and thus the battery energy density were improved.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode material for a non-aqueous electrolyte secondary battery, comprising
   negative electrode active material particles comprising a silicon compound expressed by $SiO_x$, where $0.5 \leq x \leq 1.6$, and a coating layer composed of an organic polymer coating the silicon compound, wherein
   the silicon compound contains $Li_2SiO_3$ inside, and
   the organic polymer comprises at least one of polyacrylic acid and an alkali metal salt thereof, and carboxymethyl cellulose and an alkali metal salt thereof.

2. The negative electrode material for a non-aqueous electrolyte secondary battery according to claim 1, wherein the organic polymer contains at least one of a fluoroethylene group, a carboxyl group, a hydroxyl group, and a carbonate group within its molecule.

3. The negative electrode material for a non-aqueous electrolyte secondary battery according to claim 1, wherein the organic polymer further comprises at least one polymer selected from the group consisting of polyvinyl alcohol, polycarbonate, polyvinylidene fluoride, and polyvinylidene tetrafluoride.

4. The negative electrode material for a non-aqueous electrolyte secondary battery according to claim 1, wherein a content of the organic polymer is 0.01 mass % or more and less than 5 mass % with respect to the whole negative electrode active material particles.

5. The negative electrode material for a non-aqueous electrolyte secondary battery according to claim 1, wherein at least a part of the organic polymer has an island-shaped structure.

6. The negative electrode material for a non-aqueous electrolyte secondary battery according to claim 1, wherein the silicon compound further contains at least one lithium compound on its surface, and the lithium compound is at least one selected from the group consisting of $Li_2CO_3$, $Li_2O$, and LiF.

7. The negative electrode material for a non-aqueous electrolyte secondary battery according to claim 1, wherein the silicon compound further contains at least one lithium compound selected from the group consisting of $Li_4SiO_4$ and $Li_6Si_2O_7$ inside.

8. The negative electrode material for a non-aqueous electrolyte secondary battery according to claim 1, wherein the silicon compound is at least partially coated with a carbon compound.

9. The negative electrode material for a non-aqueous electrolyte secondary battery according to claim 8, wherein a coverage of the carbon compound is 15 mass % or less with respect to a total of the silicon compound and the carbon compound.

10. The negative electrode material for a non-aqueous electrolyte secondary battery according to claim 8, wherein the silicon compound satisfies $0.05 \leq A/B \leq 3.00$ when subjected to X-ray photoelectron spectroscopy (XPS) on its surface layer where A is a peak area of a peak when a C1s binding energy is about $287.5 \pm 1.0$ eV, and B is a peak area of a peak when the C1s binding energy is about $284.0 \pm 1.0$ eV.

11. The negative electrode material for a non-aqueous electrolyte secondary battery according to claim 8, wherein the silicon compound satisfies $0.10 \leq A/B \leq 1.00$ when subjected to X-ray photoelectron spectroscopy (XPS) on its surface layer where A is a peak area of a peak when a C1s binding energy is about $287.5 \pm 1.0$ eV, and B is a peak area of a peak when the C1s binding energy is about $284.0 \pm 1.0$ eV.

12. The negative electrode material for a non-aqueous electrolyte secondary battery according to claim 1, wherein the coating layer composed of the organic polymer contains a particulate carbon-based material having a median size smaller than that of the silicon compound.

13. The negative electrode material for a non-aqueous electrolyte secondary battery according to claim 1, wherein the silicon compound exhibits a diffraction peak having a half width (2θ) of 1.2° or more, the diffraction peak being attributable to an (111) crystal face and obtained by X-ray diffraction, and a crystallite size attributable to the crystal face is 7.5 nm or less.

14. The negative electrode material for a non-aqueous electrolyte secondary battery according to claim 1, wherein the silicon compound containing $Li_2SiO_3$ inside is produced by a step including an electrochemical manner.

15. A negative electrode for a non-aqueous electrolyte secondary battery, comprising a negative electrode material according to claim 1.

16. The negative electrode for a non-aqueous electrolyte secondary battery according to claim 15, further comprising a carbon-based negative electrode material.

17. The negative electrode for a non-aqueous electrolyte secondary battery according to claim 16, wherein a median size Y of the silicon compound and a median size X of the carbon-based negative electrode material satisfy $X/Y \geq 1$.

18. A non-aqueous electrolyte secondary battery comprising a negative electrode according to claim 15.

19. A method of producing negative electrode active material particles contained in a negative electrode material for a non-aqueous electrolyte secondary battery, comprising the steps of:
   producing a silicon compound expressed by $SiO_x$ where $0.5 \leq x \leq 1.6$;

inserting lithium into the silicon compound and thereby forming a lithium compound that includes $Li_2SiO_3$ at least inside the silicon compound to modify the silicon compound; and coating the silicon compound with a coating layer composed of an organic polymer to produce the negative electrode active material particles, wherein the organic polymer comprises at least one of polyacrylic acid and an alkali metal salt thereof, and carboxymethyl cellulose and an alkali metal salt thereof.

20. The method of producing negative electrode active material particles according to claim 19, wherein the step of modifying the silicon compound is performed in an electrochemical manner.

* * * * *